(No Model.)
P. FESLER.
NUT LOCK.
No. 375,704. Patented Dec. 27, 1887.
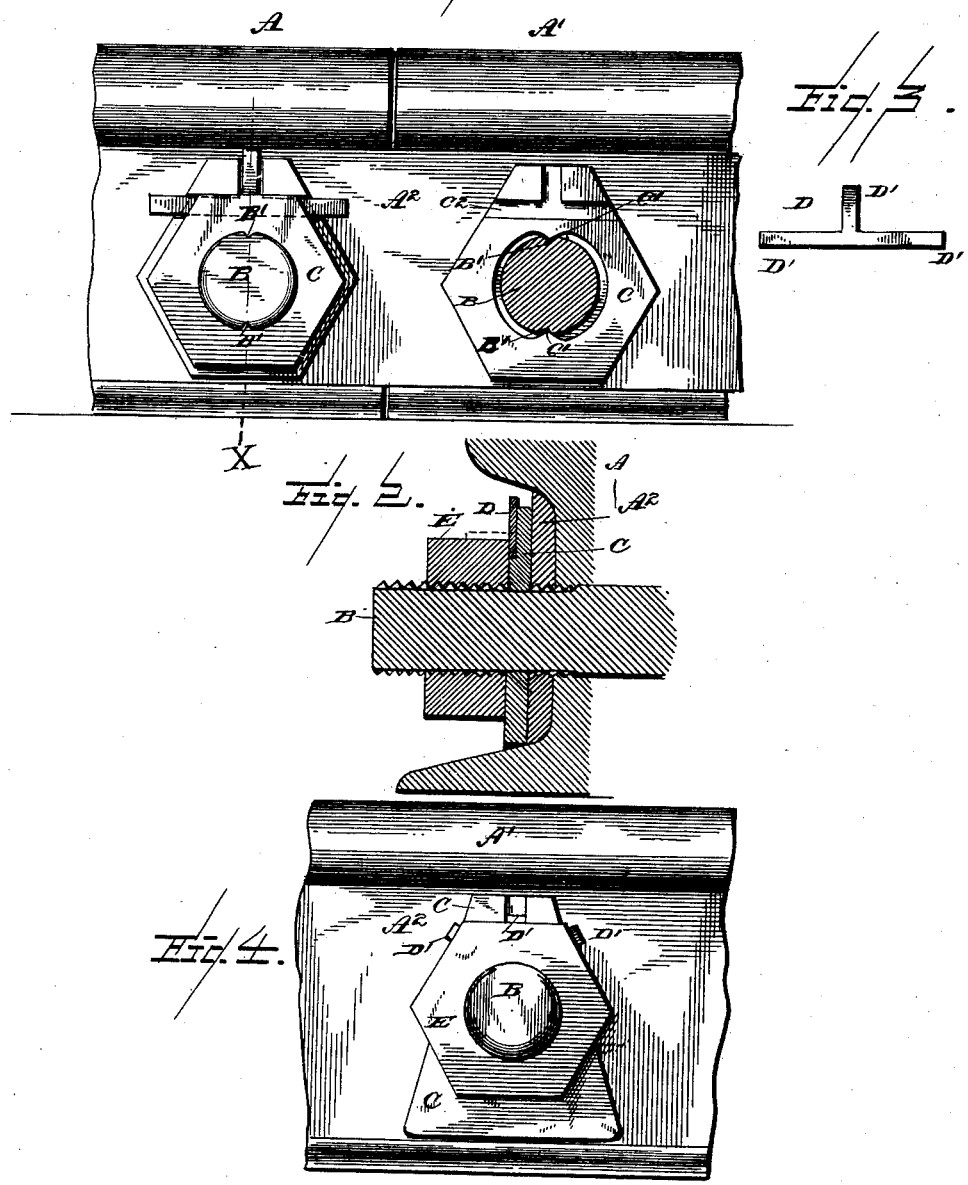
WITNESSES:
INVENTOR:
Paul Fesler
BY E. B. Stocking
ATTORNEY.

UNITED STATES PATENT OFFICE.

PAUL FESLER, OF SALEM, OHIO, ASSIGNOR OF ONE-FOURTH TO WILLIAM H. FESLER, OF SAME PLACE.

NUT-LOCK.

SPECIFICATION forming part of Letters Patent No. 375,704, dated December 27, 1887.

Application filed July 11, 1887. Serial No. 243,979. (No model.)

*To all whom it may concern:*

Be it known that I, PAUL FESLER, a citizen of the United States, residing at Salem, in the county of Columbiana, State of Ohio, have invented certain new and useful Improvements in Nut-Locks, of which the following is a specification, reference being had therein to the accompanying drawings.

This invention has relation to that class of nut-locks for joints of railway-rails known as "base-washers," and has for its object the provision of a lock that is simple in operation and consists of as few parts as possible, and which may be easily and quickly applied and, if desired, removed.

Other objects and advantages of the invention will hereinafter appear, and the novel features thereof will be particularly pointed out in the claim.

Referring to the drawings, Figure 1 is a side elevation of the joint formed of two rails and provided with a nut-lock constructed in accordance with my invention, the bolt being shown in section and the nut removed in one instance. Fig. 2 is a section taken on the line $x$ of Fig. 1. Fig. 3 is a detail in front elevation of the locking-key, and Fig. 4 is a side elevation of the nut and locking-key in position.

Like letters of reference indicate like parts in all the figures of the drawings.

A A' represent the rails, and $A^2$ the fish-plate, all of which are of the usual construction.

B B represent the bolts, which in this instance are formed with longitudinal oppositely-arranged grooves, B', but are otherwise formed in the usual well-known manner.

C represents a washer, which is preferably of hexagonal shape, as shown in Fig. 1, but which may be of a triangular or other shape, as shown in Fig. 4, the requisite being that it be provided with a straight or flat portion adapted to rest upon the base of the rail. The washer C is perforated in the usual manner and adapted to loosely pass over the bolt B, and is provided with inward spurs or ribs C' upon the inner periphery of the bolt-receiving opening, which spurs are oppositely located and adapted to take into the longitudinal grooves B' in the bolt, which connection, in addition to the straight base resting upon the flange of the rail, will prevent said washer from turning, and will also tend to prevent the bolt from being turned.

A substantially cross-shaped recess, $C^2$, is formed in the face of the washer C above its opening, and into this recess a locking-key, D, of substantially cross shape, is adapted to be seated. This locking-key is formed of malleable metal, so that when in position upon the washer and the nut upon the bolt screwed thereupon the arms D' of said key may be turned at a right angle to the remainder of the key and be made to embrace three of the sides of the nut, thus preventing the nut from working loose, all as clearly shown by dotted lines in Fig. 2 and full lines, Fig. 4. At the same time that this rigid and exceedingly secure locking of the nut is accomplished, it is evident that should occasion require the replacement of one of the rails by a new one the same can be easily accomplished by first prying the arms D' of the key out from contact with the nut E, and then removing the same and the washer.

Having described my invention, its advantages and operation, what I claim is—

The combination, with the rails A A' and fish-plate $A^2$, of the bolt B, longitudinally grooved, as at B', the washer C, having the spurs C', adapted to take into the grooves mounted on the bolt, and having the cross-shaped recess $C^2$ at one side of the bolt-hole, and with the cross-shaped malleable locking-key D seated in said recess, having the arms D', and the nut E, substantially as specified.

In testimony whereof I affix my signature in presence of two witnesses.

PAUL FESLER.

Witnesses:
JOHN E. ROGERS,
F. F. TRIMBLE.